Jan. 31, 1967  S. F. LUTTERS  3,301,421
CAR TOP BOAT LOADER
Filed July 27, 1965  2 Sheets-Sheet 1
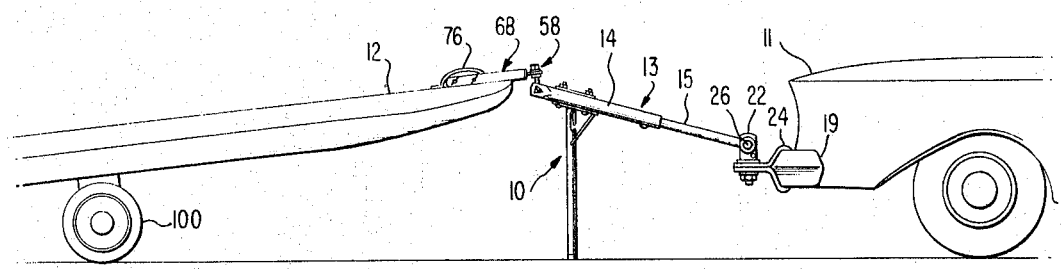
FIG.1
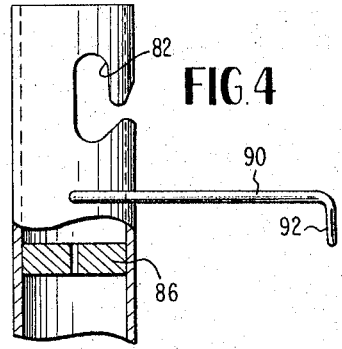
FIG.4
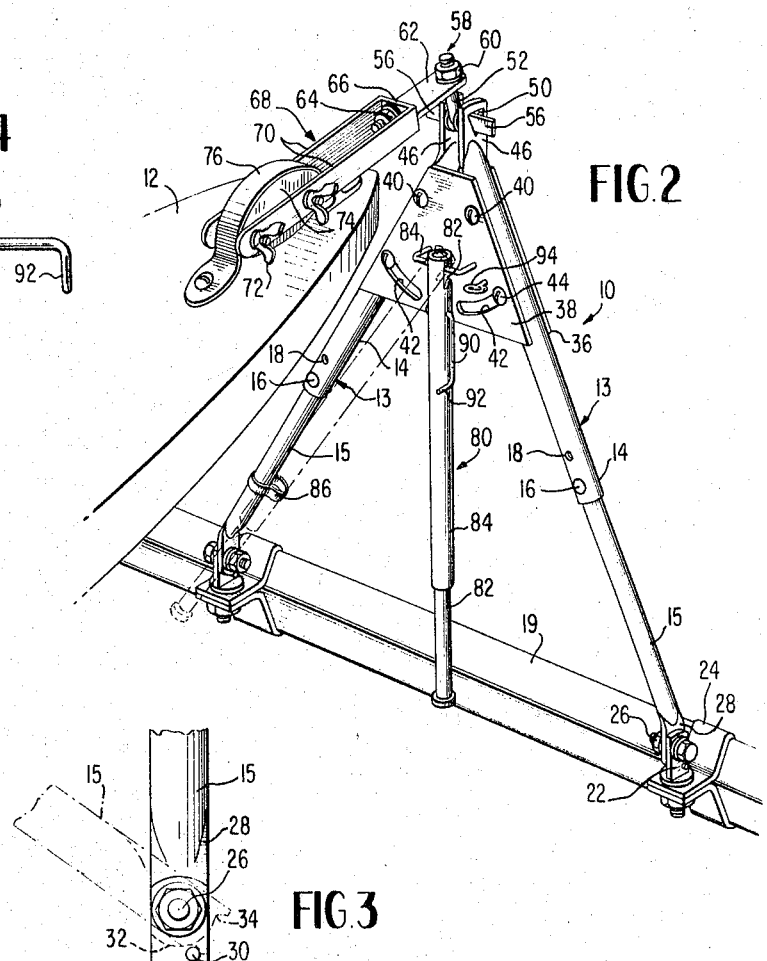
FIG.2
FIG.3
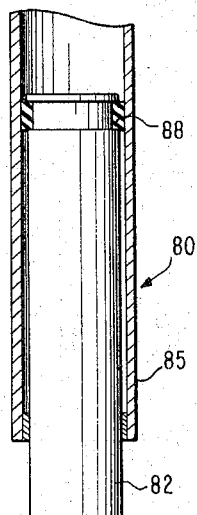
INVENTOR
SAMUEL F. LUTTERS
BY *J. Ernest Kenney*
ATTORNEY

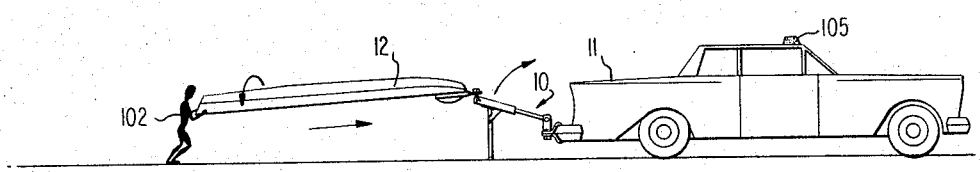
FIG.5
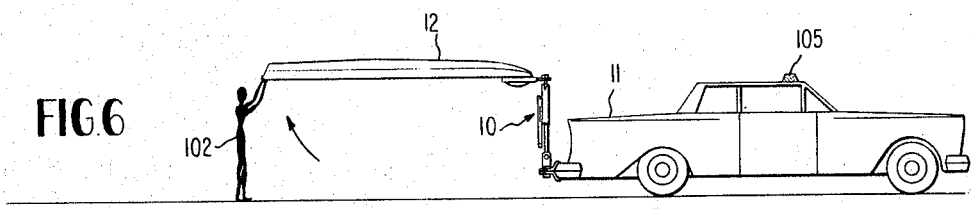
FIG.6
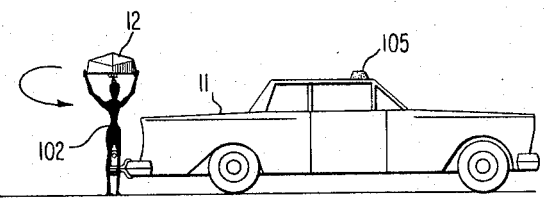
FIG.7
FIG.8
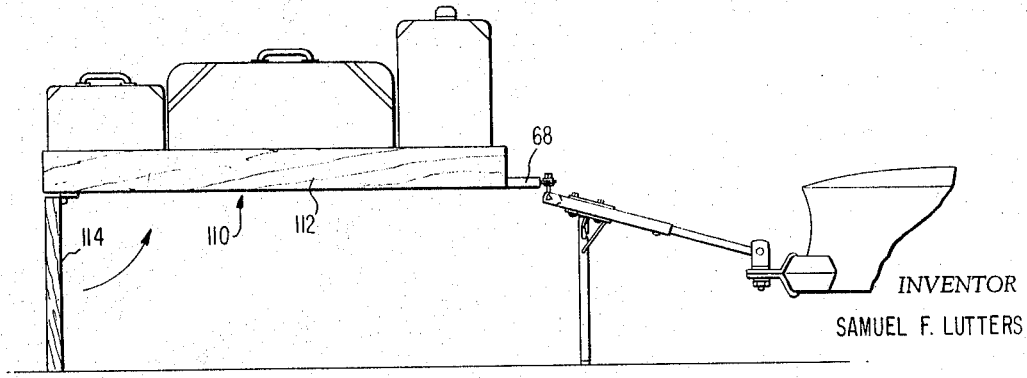
FIG.9
INVENTOR
SAMUEL F. LUTTERS
BY *J. Ernest Kenney*
ATTORNEY

United States Patent Office 3,301,421
Patented Jan. 31, 1967

3,301,421
CAR TOP BOAT LOADER
Samuel F. Lutters, 167 Pinewood Trail,
Trumbull, Conn. 06611
Filed July 27, 1965, Ser. No. 475,075
13 Claims. (Cl. 214—450)

This invention relates to a car top boat loader and more specifically to an improved boat loader for enabling one man to raise a small boat onto the roof of a vehicle such as an automobile, and for supporting the boat in its raised position on the vehicle roof.

More particularly, this invention provides a simple, economical, and efficient boat loader or lift means that is fully adjustable to accommodate various transport vehicles, attaches to the rear bumper or frame of the vehicle with which it is to be used, is safe and dependable in operation; and features an air cylinder ground engaging support leg for permitting safe and shock free lowering of the boat as it is being unloaded from the vehicle.

The boat loader of this invention essentially comprises an assembly of tubular leg elements having a pivotable connection at its upper end for engaging a boat to be lifted to a car top, and means at its lower end for being secured to a vehicle such as a car. With the boat resting on the ground in normal position initially, a single boat handler simply turns the boat over about its longitudinal axis, pushes against the unsupported end of the boat which causes the leg assembly to pivot forwardly about its attachment points to the car, and swings the boat around to the car roof where it is secured in position by any suitable means.

One of the legs of the lift assembly of this invention is adapted to engage the ground at the start of the boat lifting operation, while preferably an assembly of two other legs is attached to the rear of the transport vehicle. The single ground-engaging leg, which preferably is a telescoping air piston, is pivotally attached to the car engaging leg assembly in such a manner that the swing of the loader device rearwardly away from the vehicle is limited by the length of this leg. If the ground-engaging leg is made a telescoping, pneumatic strut, as in the preferred embodiment of this invention, when the boat is being unloaded from the vehicle, the operator, who has swung the unsupported end of the boat to the rear of the car and rotated the boat to its normal upright position, simply walks backward until the tip of the ground-engaging leg contacts the ground and then supports the free end of the boat momentarily while the shock strut slowly allows the secured end of the boat to lower to a position where it can be detached from the loader.

Accordingly, it is an object of this invention to provide a car top boat loader for enabling a single operator to lift a boat to a car top in a safe, reliable manner, and which is extremely simple in design and fully adjustable to accommodate various dimensions of boats and automobiles.

It is another object of this invention to provide a car top boat loader that is inherently stable in its lowered position and is laterally and vertically stable in raised position with respect to a vehicle to which it is attached to permit relatively carefree attaching, raising and securing of a boat with respect to the vehicle.

It is still further an object of this invention to provide a car top boat loader comprising a relatively simple, adjustable assembly of tubular leg elements for engaging the vehicle, and a third leg which engages the ground when the boat lift is in the lowered position, the third leg further comprising a telescoping shock strut which permits safe, controlled lowering of the boat being unloaded from the vehicle.

It is yet another object of this invention to provide a car top boat loader which includes a simple yet unique pivotable connection at its upper end for engaging a boat to be transported, and for enabling the boat to be rotated about its longitudinal axis and pivoted about the bow securing point by one operator in the process of raising and securing the boat to the car top.

The above objects and the advantages of the present invention will become apparent upon reference to the following description and drawings, in which:

FIGURE 1 is a side elevational view of a boat loader device embodying the present invention, the boat loader being shown attached to a vehicle at the right and the bow of a boat to the left;

FIGURE 2 is an isometric detailed view of the boat loader structure embodying the present invention;

FIGURE 3 is a detail view of a pivot point at the point where the boat loader is secured to the vehicle bumper;

FIGURE 4 is a detail, partial cutaway view of the telescoping ground engaging leg of the boat loader;

FIGURES 5 through 8 show the method of using the loader shown in FIGURES 1 through 4, and show the operator sequentially rotating the boat about its longitudinal axis, raising the stern of the boat and pushing the boat forward to a position where the legs of the boat loader secured to the vehicle are vertical, pivoting the boat about the car engaging leg assembly and finally securing the boat in its stowed position atop the transport vehicle; and FIGURE 9 shows the versatility of the boat loader of this invention and illustrates how it can be readily adapted for use with a car top luggage carrier.

Referring now to FIGURE 1, the preferred embodiment of car top boat loader or lift device of the present invention is generally indicated by the numeral 10, and is shown attached to the rear of a transport vehicle such as a car 11 and the bow of a boat to be carried 12. The lift device, as best seen in FIGURE 2, comprises a pair of elongated tubular leg members 13 each having telescoping upper and lower sections 14 and 15, respectively. The sections 14 and 15 may be locked together by means of a pin fastener in any of several positions, the pin fastener engaging mating holes such as shown at 18 in the upper or outer tube 14, and holes (not shown) in the inner tubes 15 at their upper ends where they extend within the outer tubes. Of course, it is apparent that it is of little consequence whether the upper or lower tube is the outer or inner tube, and that the telescoping relationship of the tubes can be reversed without departing from the scope of the invention; the essential fact is that the legs 13 are preferably adjustable longitudinally to vary the height of the lift device.

The two legs 13, essentially forming the car engaging means of this invention, are pivotally secured to the rear bumper 19, for example, of a transporting vehicle such as a car 11 by means of collared eye bolts 22 which are fastened to means such as bumper clamp elements 24 and through the eyes of which pass standard bolt and nut fasteners 26 which in turn extend through apertures (not shown) in flattened end sections 28 of leg portions 15 of the boat loader.

As shown in detail in FIGURE 3, each of the eye bolts 22 to which the legs 13 are secured includes a stop pin 30 which extends through the flat section of the eye bolt a short distance on the side opposite that viewed in FIGURE 3. In addition, the bottom extremity of leg portion 15 that is flattened is partially arcuately shaped in a convex sense as at 32 so that it clears the pin 30 when each of the legs 13 is rotated rearwardly, or away from the transport vehicle. However, a portion 34 of the bottom end extremity of each of legs 13 is arcuately shaped in a concave sense and engages the stop pin 30 when each leg 12 is in substantially a vertical position. The leg portion 15 is shown in full lines in FIGURE 3 in the vertical or stopped position, and in dotted lines in the downward or rearward position. The reason for this stop pin and concave arcuate curvature 34 of the bottom end section of leg 12 is to limit the rotation of the boat lift device in a forward direction or towards the transport vehicle 11 and about fasteners 26. As the boat is being swung to the raised position, the stop pin 30 and arcuately curved leg end sections 32–34 prevent overtravel of the legs 13 toward the vehicle which might otherwise occur. It will be noted from FIGURE 2 that the particular bumper clamps 24 shown are closed against the bumper 19 by means of the nuts secured to eye bolts 22, and that loosening of the eye bolt nuts permits adjustment of clamps 24 to any size bumper within design limitations and that the spacing of the hooks 24 on the bumper 19 is fully adjustable also within design limits to permit further adjustment of the height of the boat lift device. Of course, it is not necessary that a bumper hitch of the specific type illustrated be used to secure the leg assembly to the vehicle, nor is it even necessary that the assembly be secured to the bumper of a vehicle. For example, a bolted leg to bumper connection could be used, and, if desired, connection of the leg assembly could be made to a portion of the frame of a vehicle by using a suitable bracket.

The upper sections of legs 13, as seen in FIGURE 2, are joined together to form a leg assembly by means of parallel plates 36, 38. Plates 36 and 38 are each provided at their upper areas with apertures (not shown) through which fasteners 40 extend and with arcuate slots 42 at their lower areas through which fasteners 44 extend. The upper portion of each leg section 14 is provided with a suitable aperture (not shown) to accommodate the fasteners 40 and 44. To adjust legs 13 relative to each other, the fasteners 44 would be loosened somewhat and the legs pivoted about fasteners 40. The slots 42 accommodate relative movement of fasteners 44 for adjustment purposes. The fasteners 44 would the be re-secured to maintain the leg and plate assembly rigid and in fixed relationship. Thus, when the plates 36, 38 are assembled to legs 13 an adjustable connection is provided whereby the angle between the legs may be adjusted and secured at any desired value within design limits, while the legs, disposed in the form of an inverted V, are maintained in the same plane. This enables the leg assembly to be folded to a compact position for storage and also enables full adjustment of the legs to accommodate various sized transport vehicles.

The top end extremities of legs 13 are preferably flattend as shown in FIGURE 2, and bent towards a vertical and substantially parallel position so that when the legs 13 are assembled with the plates 36, 38 and spread apart to the desired angle, the portions 46 of the legs will be generally parallel, although it is by no means necessary that these ends 46 be exactly parallel for the proper operation of the boat lift device. It will be apparent from the geometry of the leg assembly and the location of the fasteners 40 that as the legs 13 are pivoted away or towards each other for adjustment purposes the upper end portions 46 of the legs will remain substantially equidistant from each other so that no mechanical interference is created between the top ends of the legs and the elements secured thereto as described hereinbelow.

The ends 46 are further each provided with a triangular aperture 50, with the apex of each of the triangular openings pointing downwardly along the leg in which the aperture is formed. Loosely mounted in a transverse sense within the opening 50 is a T bolt 52, the cross arms 56 of which extend through apertures 50 and rest in a notch formed by the lower apex point of each of the triangular apertures 50. The cross arms 56 are each generally flat and rectangular in cross section as shown in FIGURE 2 so as to permit the T bolt element 52 to rock forwardly and rearwardly in the apertures 50 on their narrow lower edges, the degree of rocking movement being limited by the sloping sides of the triangular apertures 50. The central leg 58 of the T bolt 52 is threaded to accommodate a fastener 60, and, when the bolt 52 is in assembled position, it extends upwardly generally along the longitudinal axis of the car engaging leg assembly.

Pivotally secured on the leg 58 of bolt 52 by the fastener 60 is an eyebolt element 62 having a fastener 64. The threaded shank of the eyebolt 62 extends through an aperture (not shown) in the closed end 66 of boat engaging, U shaped clevis member 68 having a longitudinal axis parallel with the boat 12 to be engaged thereby. This connection between the bolt 62 and clevis 68 is a rotatable connection in that clevis 68 is free to turn about its longitudinal axis on the bolt member 62 to permit the boat 12 to be turned over about its longitudinal axis to an upside down position prior to its being placed on the top of the transport vehicle. The parallel legs 70 of clevis 68 are provided with apertures for accommodating transverse shackle bolts 72 which extend through a block element 74 placed in the bow handle 76 of boat 12.

It is desired to point out that the preferred embodiment of this invention is designed for use with a lightweight sailboat of the type generally shown in the drawings, and which is commercially available under the tradename "Sunfish" or "Sailfish." These boats are provided with bow handles such as illustrated in the drawings and are readily secured to the boat lift of this invention by a clevis bolt and cross bolt connection such as has been just described. However, it is obvious that the boat to lift connection could be modified to accommodate virtually any boat feature capable of connecting to the lift and which would enable the lift to operate in the manner herein disclosed.

It will be apparent from FIGURE 1, particularly in view of the description given above of the relationship of T bolt 52 within apertures 50, that the clevis member 68 can be tilted downwardly from the horizontal a limited amount to enable its convenient attachment to bow handle 76 on boat 12 while the boat is resting on the ground, and furthermore that the triangular shape of aperture 50 enables the T bolt 58 to assume a substantially vertical position when the boat 12 is being so attached. With the leg assembly in vertical position, the clevis 68 can also tilt slightly forwardly or rearwardly to either side of the vertical to compensate for the bow of the boat being slightly higher or lower than its stern when it is mounted on the vehicle in transport position.

The boat lift 10 is provided with a third or ground engaging leg 80 that forms a tripod when it is assembled to the structure 10, and is in ground engaging position as shown in FIGURE 1. The provision of leg 80 in the present invention is to enable the car engaging legs 13 to be situated at a slightly inclined angle from horizontal (inclined upwardly from horizontal with respect to the pivot points at the vehicle bumper) when the boat is being secured to the lift so that a sole operator of the lift can cause the legs 13 to pivot forwardly and upwardly about their bumper attaching points simply by pushing forwardly on the boat as schematically depicted in FIGURE 5 to thereby raise the bow of the boat to rooftop level. The leg 80 also facilitates lowering of the boat 12 from the vehicle by limiting the rearward rocking of legs 13 to a safe limit whereby only the stern of the boat need be supported by the boat handler during the entire unloading operation.

Leg 80 is pivotally secured to the plate 38 by a groove connection, illustrated best in FIGS. 2 and 4, whereby groove 82 in leg 80 fits over a rod element 84 secured fast to plate 38. This type of connection enables the leg 80 to pivot freely about rod 84 in a forward and backward sense and enables the leg 80 to be readily removed from the car engaging leg assembly for storage purposes. Alternatively, if it is desired to leave leg 80 attached to plate 38 during transit, it may be swung over to one of legs 13 and secured thereto as by a clip 86. This latter position of leg 80 is shown in dotted lines in FIG-URE 2. Of course, the type of connection between leg 80 and plate 38 can be varied to suit the particular requirements of the boat lift without departing from the spirit or scope of this invention.

The leg 80, in the preferred form of this invention, is a two-piece telescoping shock strut or pneumatic piston with an air bleed for controlling the rate of compression of the strut under axial loads. As shown in FIGURES 2 and 4, leg 80 includes an inner piston section 82 which slides within a cylinder section 85 having a suitable orifice or bleed control means 86 for regulating the rate at which entrapped air can be exhausted from the cylinder 85 in the area above piston member 82. The free end of piston 82 normally contacts the ground when the boat lift mechanism is in the lowered position, while the opposite end of leg 80 is pivotally attached to the plate 38 as described above. A suitable seal means 88 is provided to minimize leakage of compressed, entrapped air past the top of piston member 82. Of course, it is to be realized that the relative positions of the piston 82 and cylinder 85 could be reversed, with the cylinder member 85 comprising the ground contacting element of leg 80, and the piston 82 being pivotally attached to plate 38. When the boat lift is rocked forwardly to vertical position, the leg 80 extends due to its own weight to an elongated position (see FIGURE 2).

The advantage of the shock strut means 80 is apparent when one considers the forces acting upon a single boat handler stationed at the aft end of the boat as he unloads the boat from the vehicle top. As the leg assembly of the boat loader means passes rearwardly through a vertical and approaches horizontal, a substantial thrust is applied to the boat handler in a rearward horizontal direction, while at the same time the forward portion of the boat tends to drop vertically downward at an increasing rate. The provision of shock absorbing means associated with the ground engaging support leg of this invention serves to absorb ground contact impact of the ground engaging leg at the final moment of lowering of the boat from the vehicle, and prevents damage to the boat and associated structure, while minimizing the degree of rearward thrust imposed on the boat handler during the final portion of the boat lowering operation. It is to be understood that, although the leg 80 is disclosed herein as comprising a variable length shock strut assembly, since this is a preferred embodiment, actually any type of shock absorber means suitable for absorbing ground engaging impact of the leg 80 could be used in combination with the ground engaging leg support means.

A movable brace element 90 is provided for holding leg 80 out at an angle from the two legs 13 as shown in FIGURE 1. Brace 90 is shown as a rod element, and includes a feature such as a hook end 92 which engages suitable securing means such as an eye 94 on plate 38. Thus, when the boat lift assembly is to be placed in the lowered position of FIGURE 1, the leg 80 is braced to its rearwardly and downwardly angled position by the boat handler before he begins to load or unload the boat to be transported. After the lifting and loading operation, the brace 90 is disengaged from the plate 38, and the leg 80 pivoted downwardly from its pivot point, and either stowed separate from the lift assembly or attached at its lower end to one of the legs 13 for transport or storage purposes.

Looking now at FIGURES 1 and 5 through 8 which schematically depict the manner of securing and sequence of lifting and loading a boat onto the roof of a transport vehicle such as an automobile, FIGURE 1 shows the boat 12 drawn up to the lowered boat lift 10 and secured thereto by the clevis 68 at the bow handle 76. The boat may be supported by a suitable wheeled carrier 100 at this point, the carrier normally being used to move the boat around for short distances. In FIGURE 5 the boat handler 102 is shown lifting the stern of the boat, rotating the boat about its longitudinal axis about the pivot point at the clevis 68, and pushing forwardly to pivot the legs 13 about their bumper attaching points. These movements are shown accomplished in FIG. 6. It will be noted that with the legs 13 pivoted to their vertical position as shown in FIG. 6, the bow of the boat is virtually at the same level or slightly above the level of the roof top of vehicle 11. As seen in FIG. 7, the handler 102 then walks around the car with the boat, pivoting the same about the T bolt 58-eyebolt 62 connection. In FIGURE 8 the boat 12 has been "walked" around the vehicle 11 so that it extends over the roof thereof. A foam pad 105 may be provided to protect the roof of the vehicle and to cushion the stern of the boat in its stowed position. The handler 102 then secures the stern of the boat 12 by suitable means such as a rope, straps or cable 108 and the vehicle and boat are in transport readiness.

In FIGURE 9 a roof top luggage carrier 110 is shown comprising a shallow box structure 112 and a pair of pivoted legs 114 or the equivalent. The box structure is secured to clevis 68 in substantially the same fashion as the boat 12, except that the connection need not be rotatable since the box 112 is not to be rotated about its longitudinal axis as is the boat. Otherwise, the loading procedure is substantially the same for the luggage carrier as the boat.

It will thus be apparent that the boat loader and carrier of this invention is an extremely simple yet efficient and safe structure for enabling a boat handler to load a small boat onto the roof top of a vehicle and to easily lower the boat to the ground from the vehicle. The rotatable clevis joint and the pivotable eyebolt connection at the top of the boat lift structure in combination with the pivotable T bolt is a unique, compact and extremely efficient joint structure for enabling a boat to be lifted, rotated and pivoted as it is being moved from its normal upright position on the ground to its inverted stowed position on a vehicle rooftop. The use of a shock strut as the ground engaging leg of the boat lift mechanism is also unique and provides for safe, controlled, and shock free unloading of the boat while its simplicity of structure lends itself to maintenance free operation and economy of manufacture.

While I have shown and described in detail a specific embodiment of my invention, it will be obvious that various changes and modifications of the structure shown could be made without departing from the spirit and scope of my invention which is set forth in the claims below.

I claim:

1. A car top boat loader comprising a car engaging means including an elongated leg assembly including a pair of leg members having upper and lower ends and adapted to be pivotally attached to a car bumper at their lower ends for enabling said leg assembly to be rocked forwardly and rearwardly relative to its lower end, said leg members being disposed in the form of an inverted V so that they lie in a single transverse plane and diverge away from the upper ends; means for adjustably securing the said legs in fixed angular relationship with respect to each other while maintaining said legs in a common plane, and substantially equidistant from each other at the upper ends, said adjustable leg securing means including a rigid member spanning said leg members adjacent their upper ends, said leg members being pivotally attached adjacent their upper ends to said rigid member for angular rotation in a common plane relative to said rigid member, and releasable fastener means for releasably locking against rotation each of said leg members with respect to said rigid member; and a boat engaging means attached to the upper ends of said legs, said boat engaging means having a longitudinal axis extending generally parallel with the longitudinal axis of a boat to be engaged thereby and being secured to said legs through a joint structure enabling rotation of said boat engaging means about its own longitudinal axis, and pivotal movement thereof about the longitudinal axis of said leg assembly in a plane generally normal thereto.

2. The car top boat loader recited in claim 1 including a third ground engaging leg member having an upper and lower end and being pivotally attached at its upper end to said adjustable securing means for said pair of leg members; and movable brace means secured to said third leg member for selectively locking said third leg at a fixed angle with respect to the said pair of leg members and in a plane extending substantially rearwardly of and normal to the plane including said pair of leg members, said fixed angle being such that said ground engaging leg extends towards the ground when said leg assembly is rocked rearwardly to a position approaching horizontal.

3. In combination, a car having a bumper feature; a boat; a car top boat loader comprising a car engaging means including an elongated leg assembly including a pair of leg elements having upper and lower ends and being disposed in the form of an inverted V wherein the leg elements lie in a single plane extending in a lateral direction with respect to the said car and diverge from each other away from their upper ends which are adjacent each other, the said leg elements being pivotally attached to the bumper feature of said car at their lower ends for enabling forward and rearward rocking of said leg assembly relative to said car; means for adjustably securing the said leg elements in a fixed angular relationship with respect to each other while maintaining said legs in a common plane, and substantially equidistant from each other at their upper ends; an aperture in the upper end of each of said leg elements each of said apertures being in lateral alignment with respect to the other and in the form of a triangle with the apex thereof pointing downwardly along the said leg element in which the aperture is formed; a T bolt member having generally flat, transversely extending cross arms with narrow lower edges and a central leg extending normal to said cross arms, said cross arms being loosely mounted transversely in said apertures with the lower edges of said cross arms resting within the lower apexes of said apertures, and said central leg extending upwardly in a direction generally parallel to the longitudinal axis of said leg assembly; an eyebolt member having its eye pivotally mounted to said central leg of said T bolt for enabling pivotal movement of said eyebolt about and in a plane normal to the axis of said central leg, and a boat engaging member secured to a detail of said boat, said boat engaging member further being rotatably secured to said eyebolt in such a manner that said boat and boat engaging means may both rotate about the longitudinal axis of the boat and the longitudinal axis of the eyebolt without restriction.

4. The combination recited in claim 3 wherein said boat engaging means is an elongated, U shaped clevis member which is longitudinally aligned with said eyebolt and rotatably secured thereto at its closed end for enabling rotation of said clevis member about its longitudinal axis, said clevis member being fixedly secured to a boat detail at its open end.

5. The combination recited in claim 3 further including a third ground engaging leg member having an upper and lower end and being pivotally attached at its upper end to said securing means for said pair of leg members; and movable brace means secured to said third leg member for selectively locking said third leg member at a fixed angle with respect to said leg members so that said third leg extends downwardly toward the ground when said leg assembly is rocked rearwardly to a position approaching horizontal; said third leg member further including a variable length shock absorbing means for limiting the rate of rearward rocking of said car engaging leg assembly when said third leg contacts the ground.

6. The combination recited in claim 3 wherein said means for adjustably securing said pair of leg elements in fixed angular relationship comprises a pair of transversely extending plate members having upper and lower edges and being secured to opposite sides of said leg members adjacent the said upper edges thereof by fastener means enabling the lateral angular rotation of each of said leg members with respect to said plate members, said plate members each further including a pair of laterally spaced arcuate slots adjacent their lower edges; and locking fastener means extending through opposite pairs of said arcuate slots and through each of said leg members for locking said leg members in fixed angular relationship relative to each other and said plate members.

7. The combination recited in claim 3 wherein the lower ends of said pair of leg members include apertures; a pair of bumper brackets engaging the bumper feature of said car; upright eyebolt means secured to said bumper brackets; fastener means extending through said eyebolts and said apertures in said leg member for pivotally securing the lower ends of said leg members to said eyebolts; a locking pin mounted in each of said eyebolts adjacent the lower extremities of said leg members; the lower extremities of each of said leg members being formed so as to clear said locking pin during rocking movement of said leg assembly in a direction rearwardly from the vertical position, and to engage said pins when in a substantially vertical position to prevent forward rocking of the leg assembly beyond a substantially vertical position.

8. The car top boat loader of claim 1 including a third ground engaging leg member attached at one end to said adjustable leg securing means, said third leg member including shock absorbing means for cushioning ground contact impact of said third leg as said car engaging means is rocked rearwardly towards a horizontal position.

9. A car top boat loader comprising, in combination, an elongated car engaging means having an upper and lower end and adapted to be pivotally attached to a car bumper at its lower end for enabling its forward and rearward rocking motion relative to said lower end; a boat engaging means secured to the upper end of said car engaging means, the said boat engaging means having a longitudinal axis extending generally parallel with the logitudinal axis of a boat to be engaged thereby and being secured to said car engaging means through a joint structure enabling rotation of said boat engaging means about its longitudinal axis relative to the car engaging means and pivoting of the boat engaging means about, and in a plane generally normal with respect to, the longitudinal axis of the said car engaging means; and a ground engaging support means secured to said car engaging means, said ground engaging support means including a shock absorber means for cushioning ground contact impact of said support means as said car engaging means is rocked rearwardly towards a horizontal position.

10. The device of claim 9 wherein said shock absorber means is integral with said ground engaging support means, and further comprises a variable length, telescoping type shock absorber member.

11. The device of claim 10 wherein the shortest length of said shock absorbing ground engaging support means is such that when fully shortened, said ground engaging support means, by its contact with the ground, prevents said car engaging means from rocking rearwardly beyond a position approaching the horizontal.

12. The car top boat loader of claim 9 wherein said ground engaging support means comprises an elongated leg member pivotally secured to said car engaging means at its upper end by means of a quick disconnect joint arrangement including an open, horizontal, undercut groove provided adjacent the upper end of said ground support means, and a horizontal rod element fixed to said car engaging means, said rod element being disposed in said undercut groove to form the said quick disconnect joint.

13. A car top boat loader comprising, in combination, an elongated car engaging means having an upper and lower end, and adopted to be pivotally attached to a car bumper at its lower end for enabling its forward and rearward rocking motion relative to said lower end; an elongated boat engaging means secured to and extending from the upper end of said car engaging means; joint structure connecting said boat engaging means to said car engaging means, said joint structure including an eyebolt member pivotally secured at its eye end to the upper end of said car engaging means for rotation about and in a plane normal to the longitudinal axis of said car engaging means; said boat engaging means comprising an elongated U shaped clevix member pivotally attached at its closed end to the bolt end of said eyebolt to enable rotation of said clevis member about its own longitudinal axis, said clevis member being adapted to engage a boat detail between its open leg sections, whereby a boat so engaged can be rotated about its own axis and pivoted about the longitudinal axis of said car engaging means during use of the boat loader.

References Cited by the Examiner

UNITED STATES PATENTS

| | | | |
|---|---|---|---|
| 2,584,163 | 2/1952 | Squires | 214—450 |
| 2,785,816 | 3/1957 | Fisher | 214—450 |
| 3,072,274 | 1/1963 | Atwell | 214—450 |

HUGO O. SCHULZ, *Primary Examiner.*